United States Patent
Durkin et al.

(10) Patent No.: US 11,654,833 B2
(45) Date of Patent: May 23, 2023

(54) VEHICLE DEPLOYABLE HANGER ASSEMBLY

(71) Applicant: Ford Global Technologies, LLC, Dearborn, MI (US)

(72) Inventors: Jedidiah Paul Durkin, Detroit, MI (US); Ryan Ritter, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 352 days.

(21) Appl. No.: 17/086,719

(22) Filed: Nov. 2, 2020

(65) Prior Publication Data

US 2022/0134960 A1    May 5, 2022

(51) Int. Cl.
B60R 7/10 (2006.01)

(52) U.S. Cl.
CPC ...................... B60R 7/10 (2013.01)

(58) Field of Classification Search
CPC  B60R 7/10; B60R 7/043; B60R 7/046; B60R 7/04
See application file for complete search history.

(56) References Cited

U.S. PATENT DOCUMENTS

| | | | |
|---|---|---|---|
| 2,706,049 A | 4/1955 | Andrews | |
| 3,385,547 A | 5/1968 | West | |
| 4,762,449 A * | 8/1988 | St. Pierre | B60P 7/0807 410/112 |
| 5,829,725 A | 11/1998 | Russo | |
| 7,118,082 B2 * | 10/2006 | Brnjac | A47G 25/065 211/106.01 |
| 7,234,672 B1 * | 6/2007 | Osterholt | B60R 7/10 248/692 |
| 7,669,821 B2 * | 3/2010 | Martin | B60R 7/08 248/306 |
| 8,490,935 B2 | 7/2013 | Myers et al. | |
| 8,677,569 B2 * | 3/2014 | Ruzich | B60N 3/023 16/444 |
| 8,820,597 B2 | 9/2014 | Huelke et al. | |
| 9,561,755 B2 | 2/2017 | Huelke et al. | |
| 9,695,975 B2 | 7/2017 | Ogawa | |
| 9,731,657 B1 | 8/2017 | Salter et al. | |
| 10,011,234 B1 | 7/2018 | Vargas Garcia et al. | |
| 10,149,565 B2 * | 12/2018 | Dave | H04M 1/04 |
| 10,220,790 B2 * | 3/2019 | Mozurkewich | B60R 7/10 |
| 10,328,861 B2 | 6/2019 | Gasca Fuentes | |
| 10,363,880 B1 | 7/2019 | Miranda Nieto et al. | |

(Continued)

*Primary Examiner* — Brian D Nash
(74) *Attorney, Agent, or Firm* — Vichit Chea; Price Heneveld LLP (57) ABSTRACT

A deployable hanger assembly for a vehicle is provided. The hanger assembly includes a housing having a front side, a back side having one or more ribs, and an aperture extending in from the front side, and a deployable hanger that pivots relative to the housing between a flush retracted stored position within the aperture and an outward extending deployed use position. The deployable hanger assembly also includes a backer plate having one or more slots configured to receive the one or more ribs on the back side of the housing, wherein the backer plate is configured to engage a backside of a trim component of the vehicle and the housing is configured to engage a front side of the trim component, and wherein the one or more ribs extend through an opening in the trim component.

18 Claims, 7 Drawing Sheets

(56) References Cited

U.S. PATENT DOCUMENTS

| | | | |
|---|---|---|---|
| 10,625,683 B2* | 4/2020 | Aguilar Ruelas | B60R 7/10 |
| 10,780,835 B2* | 9/2020 | Dresen-Rausch | B60R 11/00 |
| 2012/0043363 A1* | 2/2012 | Lee | F16B 21/082 |
| | | | 224/313 |
| 2020/0122643 A1 | 4/2020 | Loew et al. | |

* cited by examiner

VEHICLE DEPLOYABLE HANGER ASSEMBLY

FIELD OF THE DISCLOSURE

The present disclosure generally relates to vehicle hanger assemblies, such as garment hooks, grocery hooks, and cargo attachment hooks or loops, and more particularly relates to a low profile deployable hanger assembly for a vehicle interior.

BACKGROUND OF THE DISCLOSURE

Automotive vehicles typically include one or more garment hangers, typically in the form of hooks, mounted in the passenger compartment interior on trim components to permit clothing, clothing hangers, and the like to be hung from the hanger. Additionally, grocery bags may be hung from a hanger and hooks or loops may be deployed to allow for the hanging attachment of other items, such as divider nets. Typically, some hangers are fixed or stationary while other hangers may be retracted or deployed to allow a hanger feature to be stored or accessed. It may be desirable to provide for a hanger assembly that is low profile and may not be interfere with other items transported within the vehicle.

SUMMARY OF THE DISCLOSURE

According to a first aspect of the present disclosure, a deployable hanger assembly for a vehicle is provided. The deployable hanger assembly includes a housing having a front side and a back side, a deployable hanger that pivots relative to the housing between a retracted stored position and an outward extending deployed use position, a backer plate configured to connect to the back side of the housing, wherein the backer plate and the housing are configured to engage a trim component of the vehicle, one or more ribs located on one of a back side of the housing and a front side of the backer plate, and one or more slots located on the other of the back side of the housing and the front side of the backer plate for engaging the one or more ribs.

Embodiments of the first aspect of the disclosure can include any one or a combination of the following features:
- one or more ribs extend through an opening in the trim component, and wherein the backer plate and the housing sandwich a portion of the trim component;
- an aperture extending in from the front side of the housing, wherein the deployable hanger is located in the aperture in the retracted stored position;
- the hanger and the housing has a ring-shape;
- the hanger has a U-shape;
- the hanger pivots up to 90 degrees between the retracted stored position and the deployed use position;
- the housing has a plurality of ribs formed in the back side for engaging a plurality of slots in the front side of the backer plate;
- the backer plate is configured to slide relative to the housing so that the plurality of ribs engage the plurality of slots that extend to an edge of the backer plate;
- the one or more ribs each comprises a T-shaped rib;
- the deployable hanger is flush with the housing in the retracted stored position; and
- the trim component comprises a trim panel.

According to a second aspect of the present disclosure, a deployable hanger assembly for a vehicle is provided. The deployable hanger assembly includes a housing having a front side, a back side having one or more ribs, and an aperture extending in from the front side, a deployable hanger that pivots relative to the housing between a flush retracted stored position within the aperture and an outward extending deployed use position, and a backer plate having one or more slots configured to receive the one or more ribs on the back side of the housing, wherein the backer plate is configured to engage a backside of a trim component of the vehicle and the housing is configured to engage a front side of the trim component, and wherein the one or more ribs extend through an opening in the trim component.

Embodiments of the second aspect of the disclosure can include any one or a combination of the following features:
- the hanger and the housing has a ring-shape;
- the hanger has a U-shape;
- the hanger pivots up to 90 degrees between the retracted stored position and the deployed use position;
- the housing has a plurality of ribs formed in the back side for engaging a plurality of slots in the backer plate;
- the backer plate is configured to slide relative to the housing so that the plurality of ribs engage the plurality of slots that extend to an edge of the backer plate; and
- the one or more ribs each comprises a T-shaped rib.

According to a third embodiment of the present disclosure, a method of assembling a deployable hanger assembly onto a trim component of a vehicle. The method includes the steps of providing a housing having a front side, a back side having one or more ribs, and an aperture extending in from the front side, coupling a deployable hanger to the housing, wherein the deployable hanger pivots relative to the housing between a retracted stored position within the aperture and an outward extending use position, and attaching a backer plate having one or more slots onto the one or more ribs on the back side of the housing such that the housing and the backer plate sandwich a portion of the trim component.

Embodiments of the third aspect of the disclosure can include any one or a combination of the following features:
- extending one or more ribs of the housing through an opening in the trim component, and sliding the backer plate on the back side of the trim panel to engage one or more T-ribs to hold the hanger assembly in an assembled position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
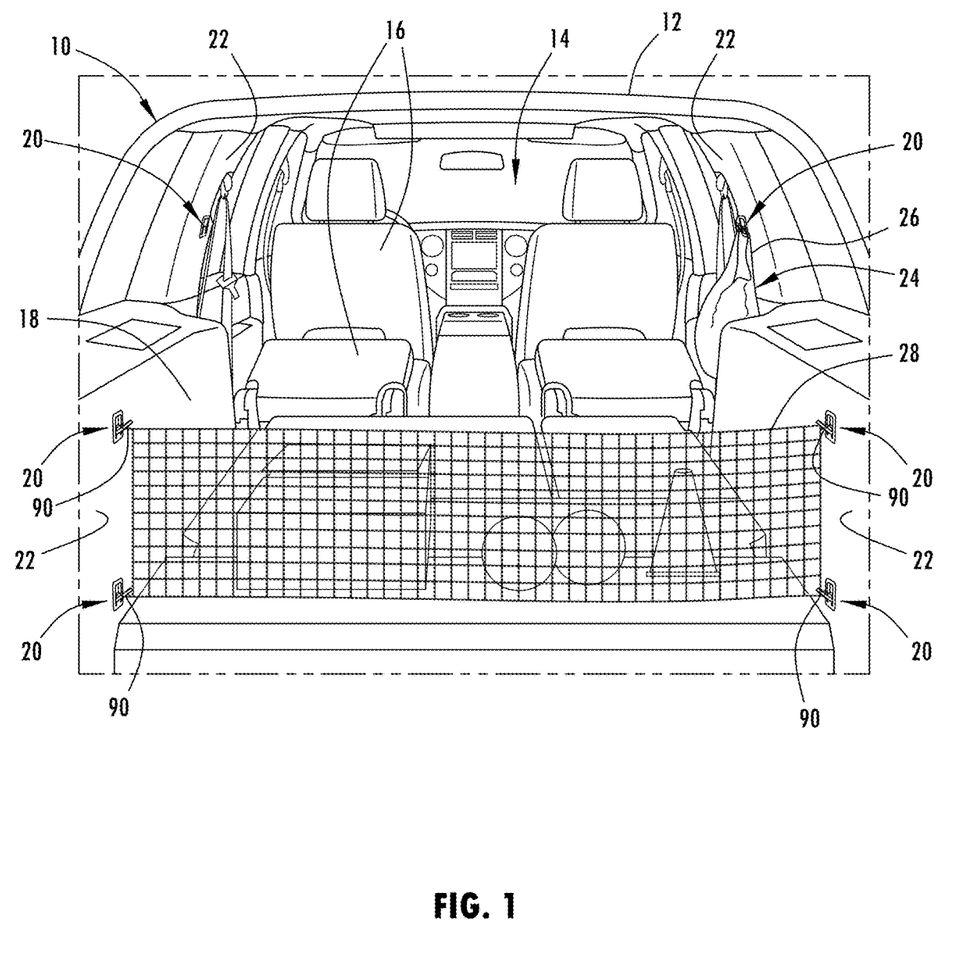
FIG. 1 is a perspective view of a vehicle cabin having hanger assemblies disposed at various locations throughout the cabin interior.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle hanger assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIG. 1, the cabin interior 14 of a wheeled automotive or motor vehicle 10 is generally illustrated configured with passenger seating and having one or more low profile deployable hanger assemblies each designated as reference numeral 20. The cabin interior 14 is generally defined by a vehicle body 12 and may contain various features and trim components 22 within the body 12. The cabin interior 14 is shown having an arrangement of passenger seats 16 as well as various consoles, controls and human machine interfaces (HMIs). The cabin interior 14 is shown having a storage space 18 rearward of the seats 16. The trim components 22 may be a part of or attached to various components in the cabin interior 14 of the vehicle 10 including the seats 16, consoles, side pillars, headliner, panels, and other surfaces that cover the body 12 or are visibly exposed in the cabin interior 14 of the vehicle 10.

One or more deployable hanger assemblies 20 may be assembled in the cabin interior 14 of the vehicle 10 to one or more trim components at any of a number of locations. In the example shown, a pair of deployable hanger assemblies 20 are shown located on trim components proximate to side pillar panels or the headliner on opposite lateral sides of the cabin interior 14, generally located in the second row of seating. Additionally, four deployable hanger assemblies 20 are shown connected to trim components 22 such as trim panels in the rear cargo storage space 18 with upper and lower pairs of deployable hanger assemblies 20 on opposite lateral sides of the vehicle 10. The four deployed hanger assemblies 20 in the cargo storage space 18 are connected to a divider net 28, according to one example. The divider net 28 may include four connectors 90 at each corner of the divider net 28 that engage and connect onto each of the U-shaped hanger on the four vehicle hanger assemblies 20.

The deployable hanger assembly 20 may be used individually as a hanger to hang items, such as grocery bags, garments, garment hangers and other objects. In one example shown, a grocery bag 24 having a strap 26 is hung on one of the deployable hanger assemblies 20 located on a side pillar trim panel. The deployable hanger assembly 20 includes a loop formed by the U-shaped hanger and housing that allows for other objects to be connected thereto, such as the divider net 28 which may be connected to and extend between two or more of the deployable hanger assemblies 20, such as four hanger assemblies as shown in the rear storage space 18 to connect the divider net 28 and extend the net across the storage space 18 to divide the rear cargo storage space 18 and contain items therein.

Figure 2:
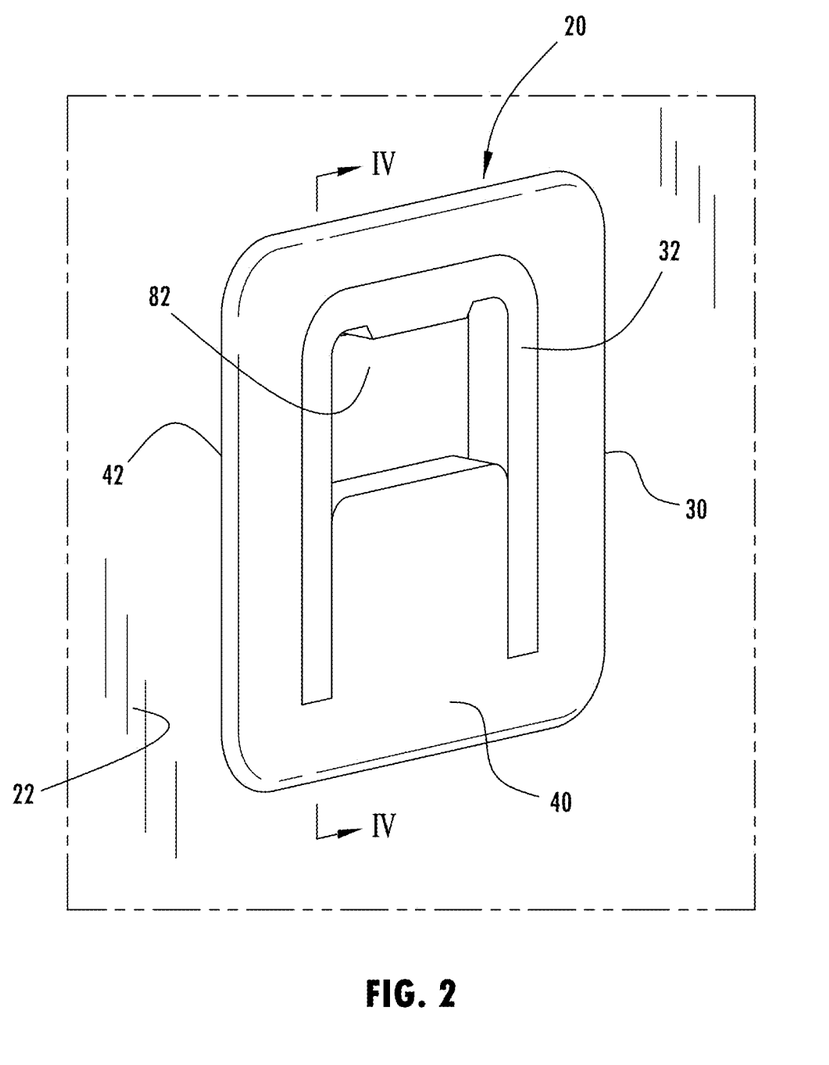
FIG. 2 is an enlarged perspective view of a hanger assembly with a U-shaped deployable hanger shown in the retracted stored position.
Figure 4:
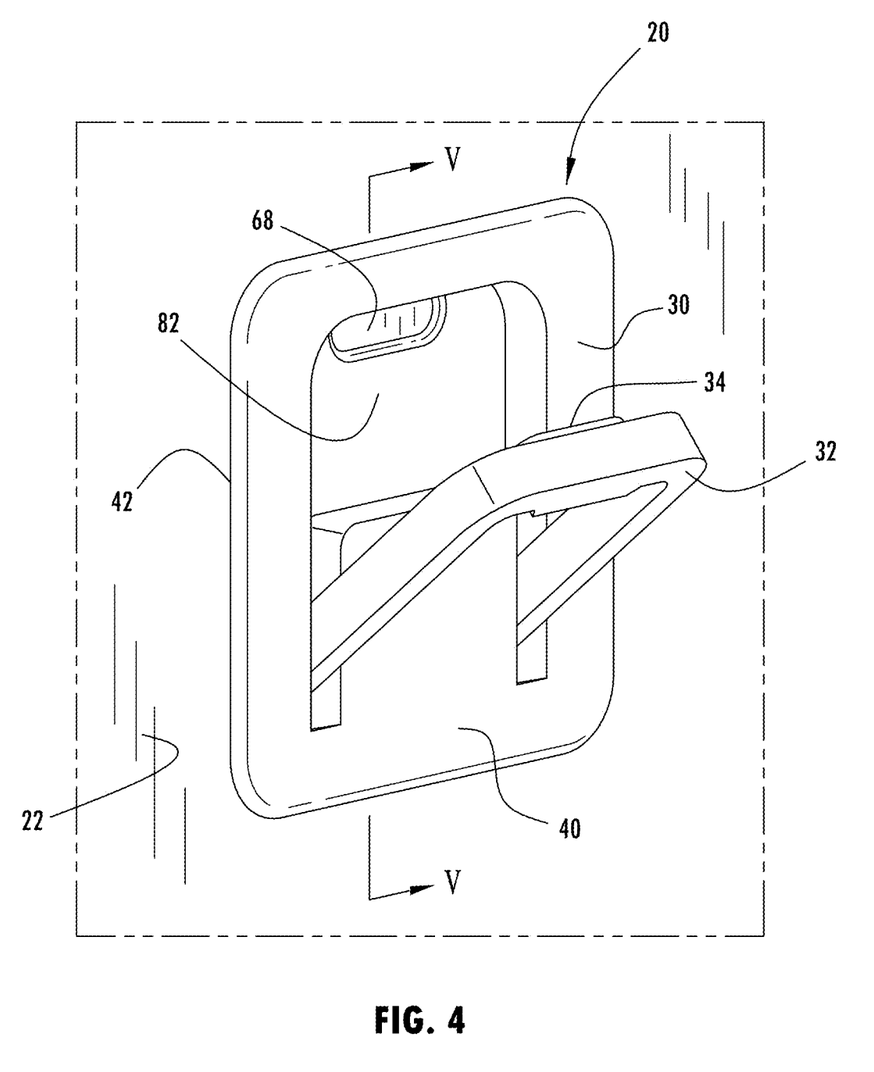
FIG. 4 is an enlarged perspective view of the hanger assembly of FIG. 2 with the deployable hanger shown in a deployed use position.

Referring to FIG. 2, one of the deployable hanger assemblies 20 is illustrated in a retracted stored position. The deployable hanger assembly 20 includes a bezel or housing 30 having a front side 40 and an aperture 82 extending therethrough from the front side 40 to a rear side 42. A deployable hanger 32 is disposed within the aperture 82 and pivots relative to the housing 30 between the retracted stored position shown in FIG. 2 and an outward extending deployed use position as seen in FIG. 4. In the retracted stored position, the deployable hanger 32 may be substantially flush with the housing 30 which may be substantially flush with or extend outward slightly (e.g., 1 mm) from the surrounding trim component 22. As a consequence, the retracted stored hanger 32 does not extend much, if at all, into the cabin interior 14 such that it is low profile and therefore in the retracted hanger position, will not interfere with objects transported within the cabin interior 14.

Figure 3:
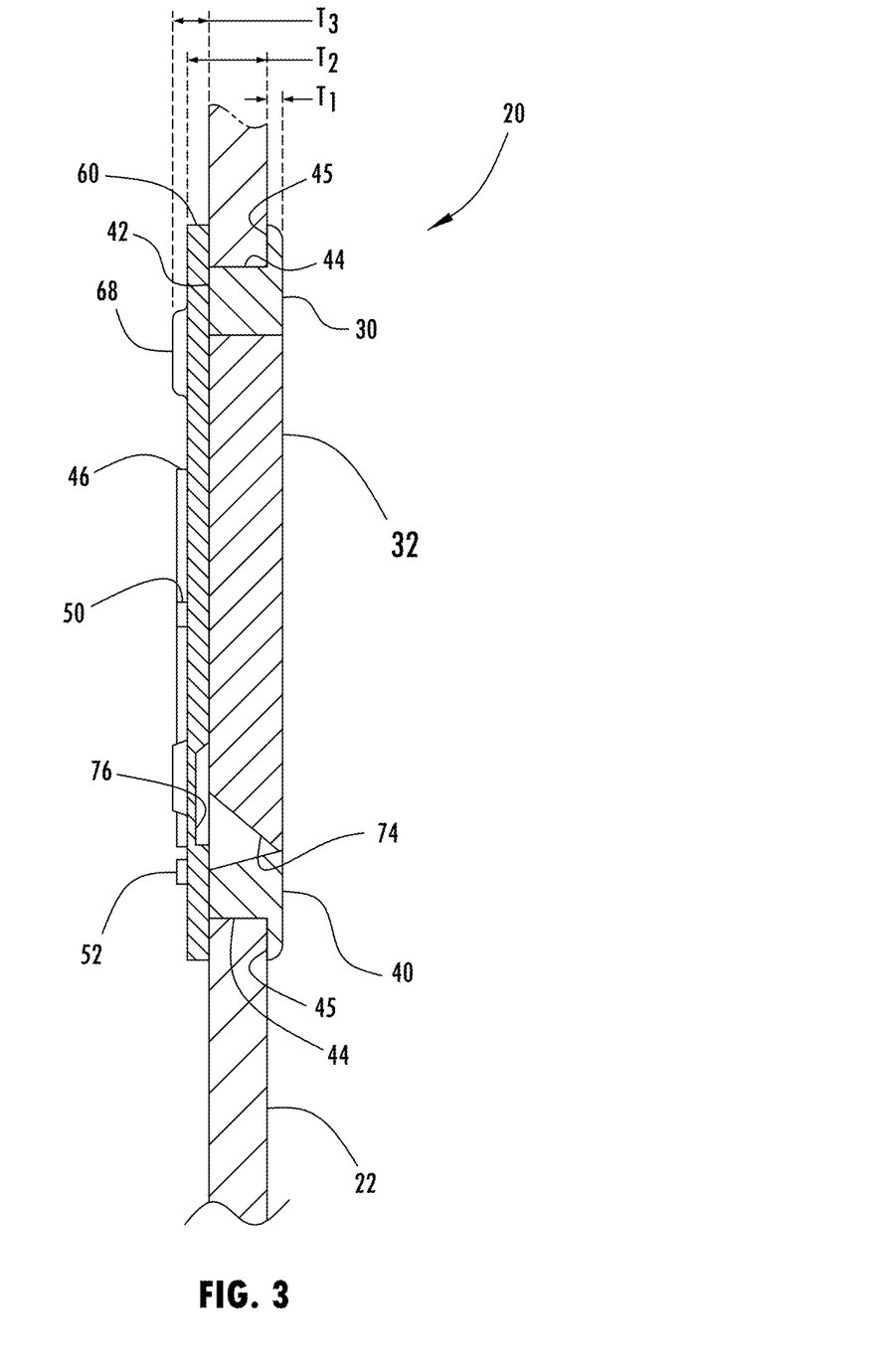
FIG. 3 is a cross-sectional view taken through line of FIG. 2 further illustrating the hanger assembly in the retracted stored position.

As seen in FIG. 3, the bezel or housing 30 is disposed within a central opening 80 in the trim component 22 and is assembled onto and thereby connected to a backer plate 60. The backer plate 60 and housing 30 sandwich a peripheral portion of the trim component 22 surrounding the central opening 80 to fix the deployable hanger assembly 20 in the mounted position. Housing 30 has a rearward protruding portion 44 that extends within central opening 80. Housing 30 further includes an enlarged peripheral portion 45 that extends in size larger than the central opening 80 such that enlarged surface 45 engages a front peripheral portion of the trim component 22. The enlarged portion 45 has a thickness $T_1$ that extends forward of the trim component 22. The trim component 22 may have a thickness $T_2$ such as 2 to 5 mm, for example. The backer plate and rearward extending connector elements have a thickness $T_3$. It should be appreciated that the total thickness of the deployable hanger assembly 20 may be less than 10 mm, such as 9 mm, according to one example. In this example, the thickness $T_1$ may be approximately 1 mm, thickness $T_2$ may be 5 mm, and thickness $T_3$ may be 3 mm. As such, the deployable hanger assembly 20 is low profile on both the front side and the rear side of the trim component 22.

Referring to FIG. 4, the deployable hanger assembly 20 is shown in a deployed use position with the deployable hanger 32 rotated or pivoted outward from the retracted stored position to the deployed use position. The deployable hanger 32 is shown having a U-shaped member which may pivot between the retracted stored position in which the deployable hanger 32 is vertical moving outward to the deployed use position to hang an item vertically due to gravity, the deployable hanger 30 may pivot outward at an angle of approximately seventy-five degrees (75°) or less, such as 45°, according to one embodiment. According to other embodiments, the deployable hanger 32 may pivot outward relative to the retracted stored position by an angle of ninety degrees (90°) or less. According to further embodiments, the hanger 32 may pivot up to one hundred eighty degrees (180°). The hanger 32 may serve to hold an item, such as a grocery bag, a garment bag or a garment hanger when positioned in the deployed use position. In addition, the U-shaped hanger 32 along with housing 30 provides a hanger loop or ring that allows for one or more items to be connected thereto. For example, a divider net may be extended across the vehicle interior 14 by connecting a net connector to the loop portion of two or more hangers 32.

The hanger 32 may further include an upper projection 34 to serve as a catch to prevent hanging items from sliding towards the end and falling off the hanger 32 in the deployed use position, particularly during normal vehicle driving conditions. The upper projection 34 may be a tooth or rib, according to various examples. The upper projection 34 may be received within a cavity 68 in the front surface of the backer plate 60 when in the retracted stored position.

Figure 5:
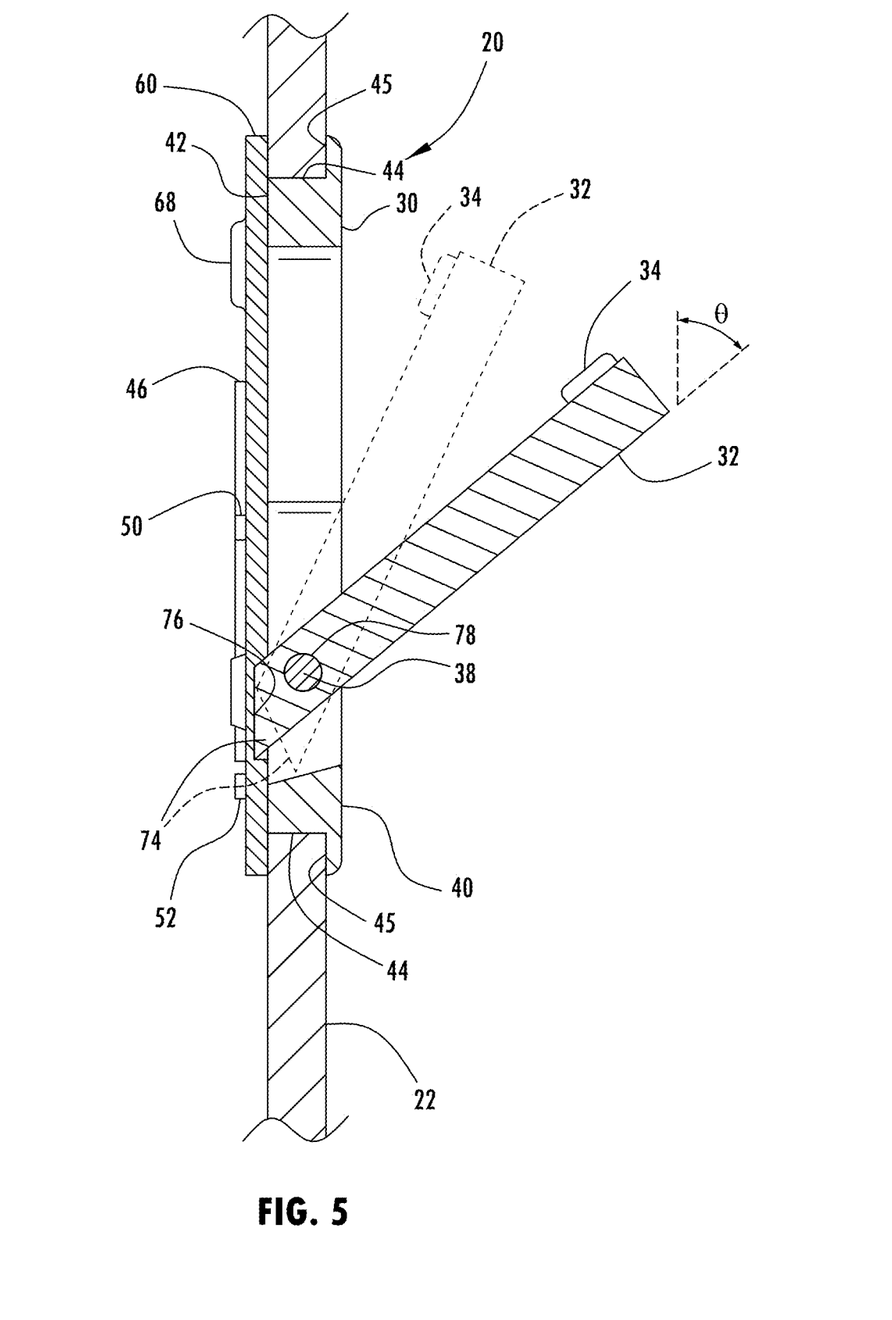
FIG. 5 is a cross-sectional view taken through line V-V of FIG. 4 further illustrating the hanger assembly in the deployed use position.

Referring to FIG. 5, the deployable hanger assembly 32 is further illustrated in the deployed use position. The hanger 32 pivots about a pair of inward oriented pivot pins 36 and 38 that are connected to the housing 30 within outward facing holes 76 and 78. The hanger 32 has an angled end 74 on each arm that may engage a stop slot 76 provided in the backer plate 60 when the hanger 32 is in the fully deployed use position as shown in FIG. 5. The deployable hanger 32 may be rotated inward back to the retracted stored position where the hanger 32 is flush with the housing 30 and nearly flush, e.g., within 1-2 mms of the trim component surface 22.

Figure 6:
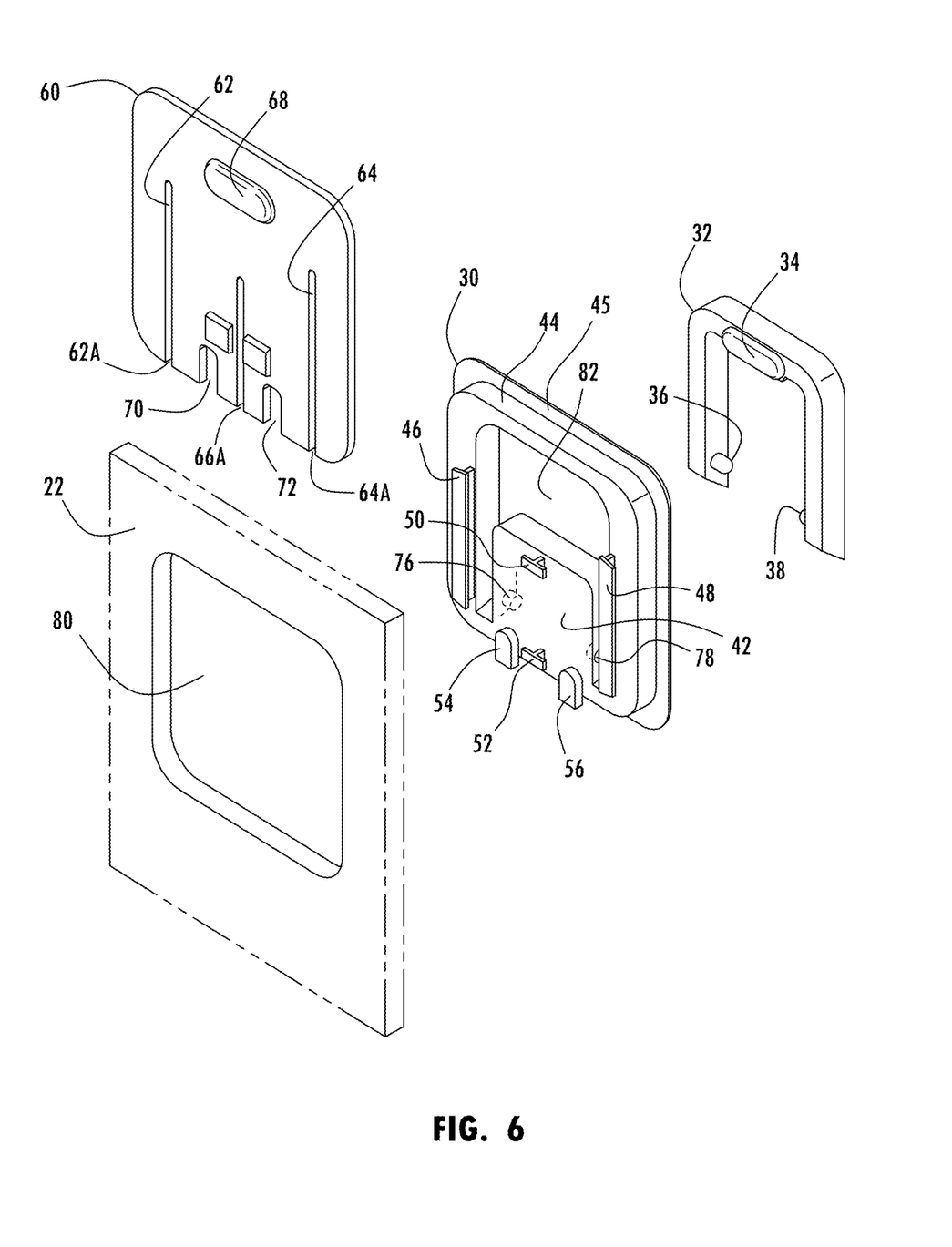
FIG. 6 is an exploded rear perspective view of the disassembled hanger assembly shown in FIG. 2.

Referring to FIG. 6, various components of the deployable hanger assembly 20 are shown disassembled as seen in a rear side view. The deployable hanger 32 includes the pair of inward protruding pins 36 and 38 near the base of the arms adapted to be received within respective holes 76 and 78 in inner side walls of the housing 30. The housing 30 has a rear side 42 having various connector features that are configured to extend through the central opening 80 within trim component 22 and engage the backer plate 60. According to one embodiment, the connector components include a first T-shaped rib 46 near one side of the housing 30 and a second T-shaped rib 48 near the opposite side of the housing 30. The T-shaped ribs 46 and 48 each have a T-shaped cross section and extend substantially parallel to one another for engaging respective slots 62 and 64 within the backer plate 60. Slot 62 has an open end 62A for slidably engaging the first T-shaped rib 46 and slot 64 has an open end 64A for slidably engaging the second T-shaped rib 48. The T-shaped ribs 46 and 48 are adapted to be received within respective slots 62 and 64 during the assembly process and to retain the backer plate 60 connected to the housing 30. In addition, the housing 30 has third and fourth T-shaped ribs 50 and 52 which are configured to be received within slot 66 of backer plate 60. Slot 66 likewise has an open end 66A for slidably receiving the T-shaped ribs 50 and 52. A pair of tabs 54 and 56 are provided on the rear side 42 of housing 30 to engage slots 70 and 72 in the backer plate which form a stop position during the assembly of the backer plate 60 onto the housing 30. Each T-shaped rib 46, 48, 50 and 52 has an outward extending base connected to an orthogonal cross member that traps the rib within the respective slot.

The backer plate 60 has an overall size larger than the central opening 80 in the trim component 22 such that the backer plate 60 and the enlarged portion 45 of the housing 30 are able to sandwich a portion of the trim component 22 extending around the central opening 80 in the assembled state. As such, the backer plate 60 and housing 30 are fixed in place on the trim component 22 with a low profile assembly.

While the deployable hanger assembly 20 is shown and described herein having one or more ribs located on the back side of the housing 30 and one or more slots located on the front side of the backer plate 60, it should be appreciated that the one or more ribs may be located on one of a back side of the housing and a front side of the backer plate 60 and the one or more slots may be located on the other of the back side of the housing 30 and the front side of the backer plate 60 for engaging the one or more ribs. As such, the one or more ribs may be located on the front side of the backer plate 60 and the one or more slots may be located on the back side of the housing 30, according to another embodiment.

Figure 7:
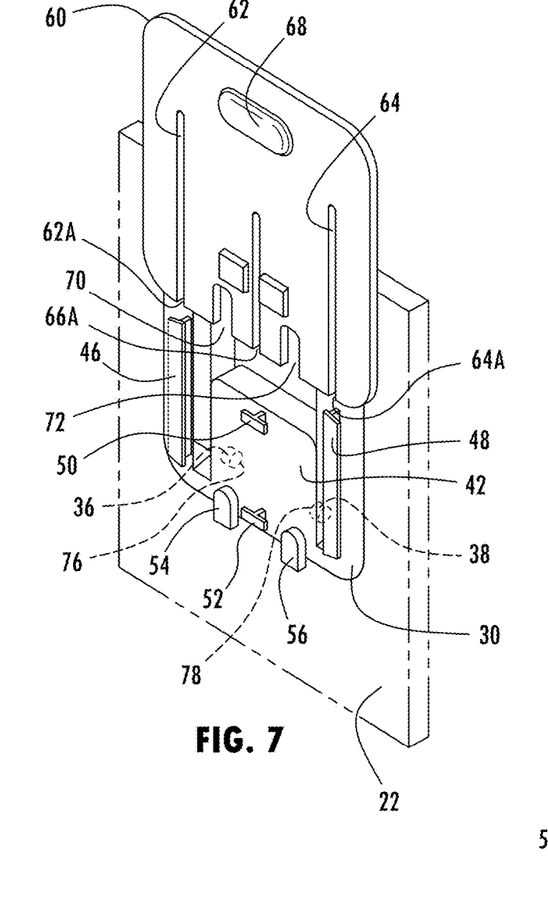
FIG. 7 is a partial exploded rear perspective view of the hanger assembly showing assembly of the backer plate onto the housing.
Figure 8:
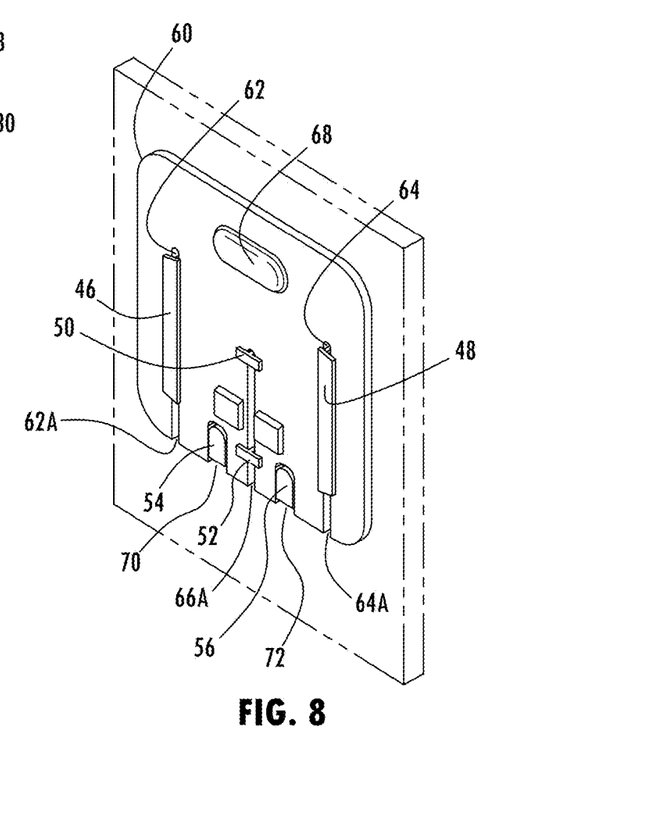
FIG. 8 is a rear perspective view of the hanger assembly shown in a fully assembled condition.

Referring to FIGS. 7 and 8, the assembly of the deployable hanger assembly 20 is illustrated. During the assembly process, the housing 30 with hanger 32 is inserted through central opening 80 in trim component 22. The backer plate 60 is positioned on the back side of the trim component 22 and is moved downward so as to slide slots 62, 64 and 66 downward into engagement with the T-shaped ribs 46, 48, 50 and 52 until slots 70 and 72 engage stop tabs 54 and 56, respectively. The T-shaped ribs 46, 48, 50 and 52 thereby are trapped within the slots 62, 64 and 66 to retain the backer plate 60 in a fixed position.

While T-shaped retention ribs 46, 48, 50 and 52 are shown and described herein according to one embodiment, it should be appreciated that other shaped ribs, such as L-shaped ribs may be employed to engage slots and retain the backer plate 60 fixed to the housing 30 according to other embodiments. The vehicle hanger assembly 20 is thereby easy to assemble onto a vehicle trim component and may provide a low profile substantially flush arrangement when in the retracted stored position. As such, the vehicle hanger assembly 20 may not be exposed such as to interfere with the movement of objects within the vehicle interior.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A deployable hanger assembly for a vehicle, the hanger assembly comprising:
    a housing having a front side and a back side;
    a deployable hanger that pivots relative to the housing between a retracted stored position and an outward extending deployed use position;
    a backer plate configured to connect to the back side of the housing, wherein the backer plate and the housing are configured to engage a trim component of the vehicle;
    a plurality of ribs located on one of a back side of the housing and a front side of the backer plate; and
    a plurality of slots located on and extending to an edge of the other of the back side of the housing and the front side of the backer plate for engaging the one or more ribs, wherein the backer plate is configured to slide relative to the housing so that the plurality of ribs engage the plurality of slots.

2. The hanger assembly of claim 1, wherein the plurality of ribs extend through an opening in the trim component, and wherein the backer plate and the housing sandwich a portion of the trim component.

3. The hanger assembly of claim 1 further comprising an aperture extending in from the front side of the housing, wherein the deployable hanger is located in the aperture in the retracted stored position.

4. The hanger assembly of claim 1, wherein the hanger and the housing has a ring-shape.

5. The hanger assembly of claim 1, wherein the hanger has a U-shape.

6. The hanger assembly of claim 5, wherein the hanger pivots up to 90 degrees between the retracted stored position and the deployed use position.

7. The hanger assembly of claim 1, wherein the housing has the plurality of ribs formed in the back side for engaging the plurality of slots in the front side of the backer plate.

8. The hanger assembly of claim 7, wherein the plurality of slots extend to an edge of the backer plate.

9. The hanger assembly of claim 1, wherein the plurality of ribs each comprises a T-shaped rib.

10. The hanger assembly of claim 1, wherein the deployable hanger is flush with the housing in the retracted stored position.

11. The hanger assembly of claim 1, wherein the trim component comprises a trim panel.

12. A deployable hanger assembly for a vehicle, the hanger assembly comprising:
    a housing having a front side, a back side having a plurality of ribs, and an aperture extending in from the front side;
    a deployable hanger that pivots relative to the housing between a flush retracted stored position within the aperture and an outward extending deployed use position; and
    a backer plate having a plurality of slots configured to receive the plurality of ribs on the back side of the housing, wherein the backer plate is configured to engage a backside of a trim component of the vehicle and the housing is configured to engage a front side of the trim component, and wherein the plurality of ribs extend through an opening in the trim component, wherein the backer plate is configured to slide relative to the housing so that the plurality of ribs engage the plurality of slots that extend to an edge of the backer plate.

13. The hanger assembly of claim 12, wherein the hanger and the housing has a ring-shape.

14. The hanger assembly of claim 12, wherein the hanger has a U-shape.

15. The hanger assembly of claim 14, wherein the hanger pivots up to 90 degrees between the retracted stored position and the deployed use position.

16. The hanger assembly of claim 12, wherein the plurality of ribs each comprises a T-shaped rib.

17. A method of assembling a deployable hanger assembly onto a trim component of a vehicle, the method comprising the steps of:
    providing a housing having a front side, a back side having a plurality of ribs, and an aperture extending in from the front side;
    coupling a deployable hanger to the housing, wherein the deployable hanger pivots relative to the housing between a retracted stored position within the aperture and an outward extending use position;
    extending the plurality of ribs of the housing through an opening in the trim component; and
    attaching a backer plate having a plurality of slots onto the plurality of ribs on the back side of the housing such that the housing and the backer plate sandwich a portion of the trim component, the step of attaching the backer plate include;

engaging the plurality of ribs into the plurality of slots that extend to an edge of the backer plate; and sliding the backer plate on the back side of the trim panel to engage the plurality of ribs in the plurality of slots to hold the hanger assembly in an assembled position.

18. The method of claim 17, wherein the plurality of ribs each comprises a T-shaped rib.

\* \* \* \* \*